(12) United States Patent
Nakada

(10) Patent No.: US 11,115,631 B2
(45) Date of Patent: Sep. 7, 2021

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Yuichi Nakada, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/659,732

(22) Filed: Oct. 22, 2019

(65) Prior Publication Data

US 2020/0137363 A1    Apr. 30, 2020

(30) Foreign Application Priority Data

Oct. 26, 2018   (JP) .............................. JP2018-202079

(51) Int. Cl.
   *G03B 21/14*    (2006.01)
   *H04N 9/31*    (2006.01)
   *H04N 13/363*    (2018.01)
   *H04N 5/74*    (2006.01)

(52) U.S. Cl.
   CPC ........... *H04N 9/3141* (2013.01); *G03B 21/14* (2013.01); *H04N 5/74* (2013.01); *H04N 13/363* (2018.05)

(58) Field of Classification Search
   CPC ...... H04N 9/3141; H04N 13/363; H04N 5/74; G03B 21/14

USPC ........................................................ 348/744
See application file for complete search history.

(56) References Cited

U.S. PATENT DOCUMENTS

| 8,798,451 B1* | 8/2014 | Kweon .................. G06T 3/0018 396/20 |
| 10,304,164 B2 | 5/2019 | Nakada |
| 2018/0205929 A1* | 7/2018 | Fattal ................... H04N 13/111 |

FOREIGN PATENT DOCUMENTS

JP     2007318754 A     12/2007

* cited by examiner

*Primary Examiner* — John W Miller
*Assistant Examiner* — Sihar A Karwan
(74) *Attorney, Agent, or Firm* — Carter, DeLuca & Farrell LLP

(57) ABSTRACT

There is provided with an image processing apparatus. A setting unit sets a display magnification on the display surface for the captured image data. A generating unit generates the display image data from the captured image data, based on a relationship between a first direction from an observer viewpoint toward a position on the display surface at which an object is displayed when display is provided based on the captured image data in accordance with the display magnification and a second direction from an capturing viewpoint of the captured image data toward the object, such that an image of the object in the second direction from the capturing viewpoint of the captured image data is displayed at a position on the display surface in the first direction from the observer viewpoint.

19 Claims, 10 Drawing Sheets

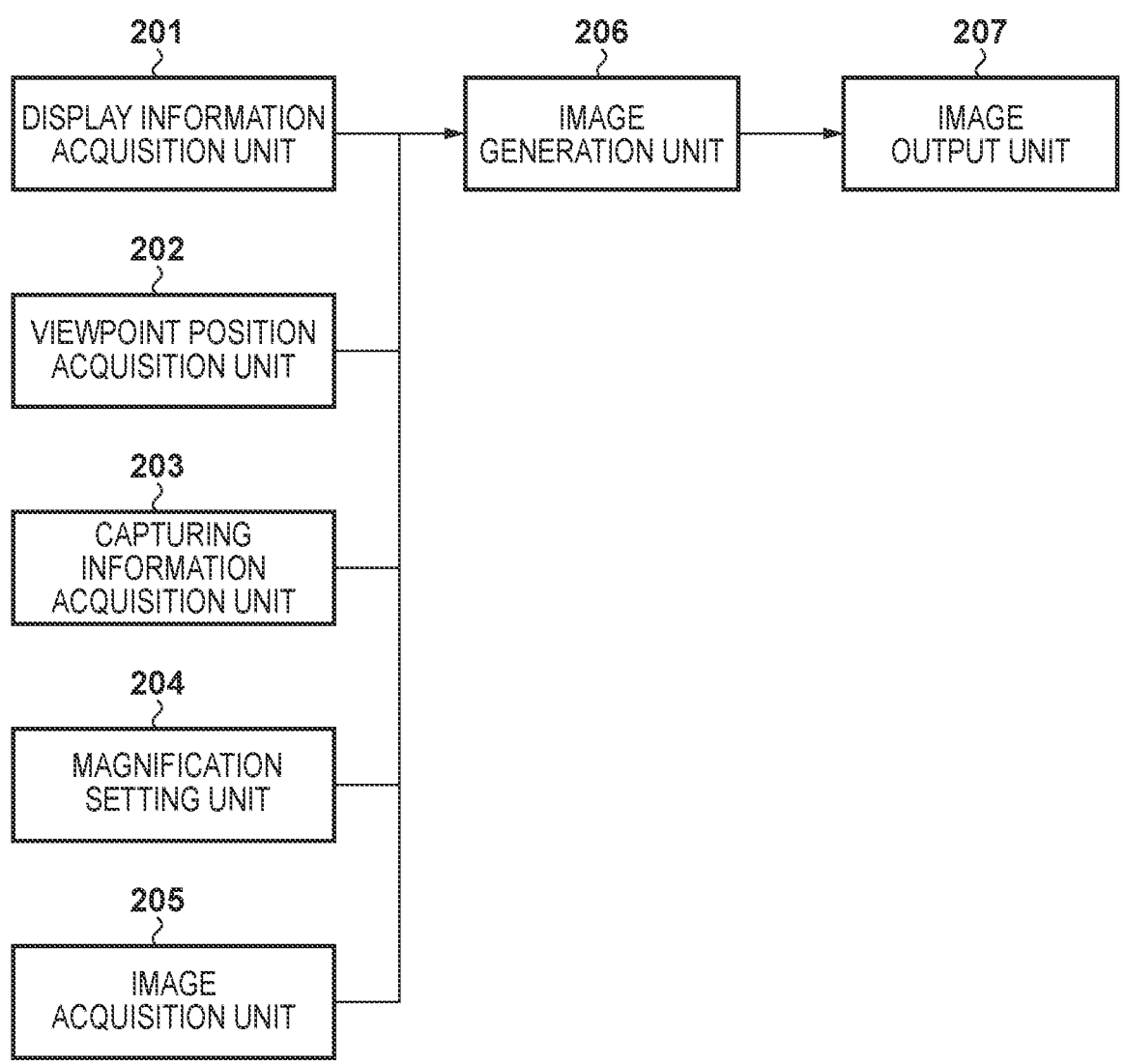

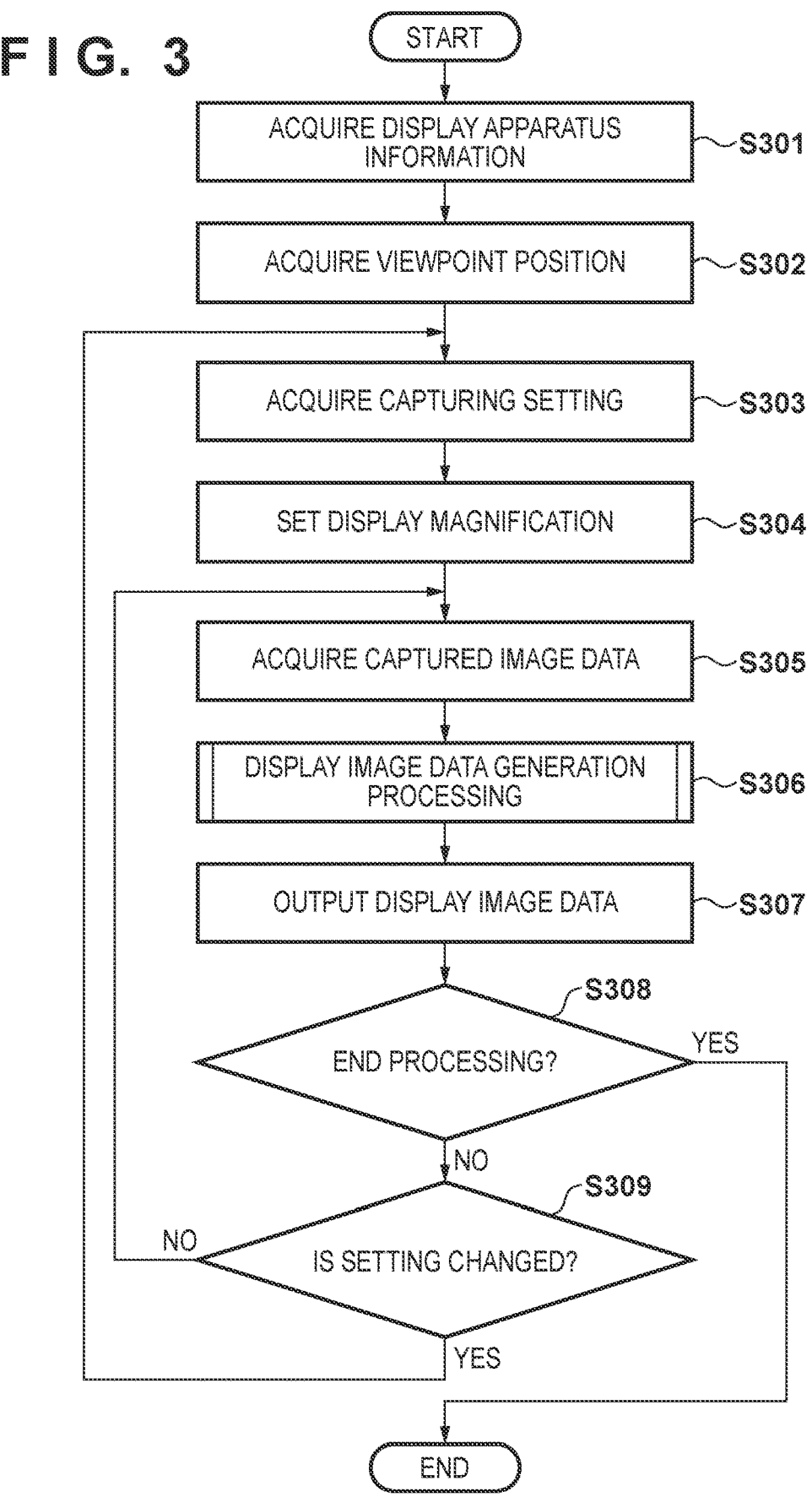

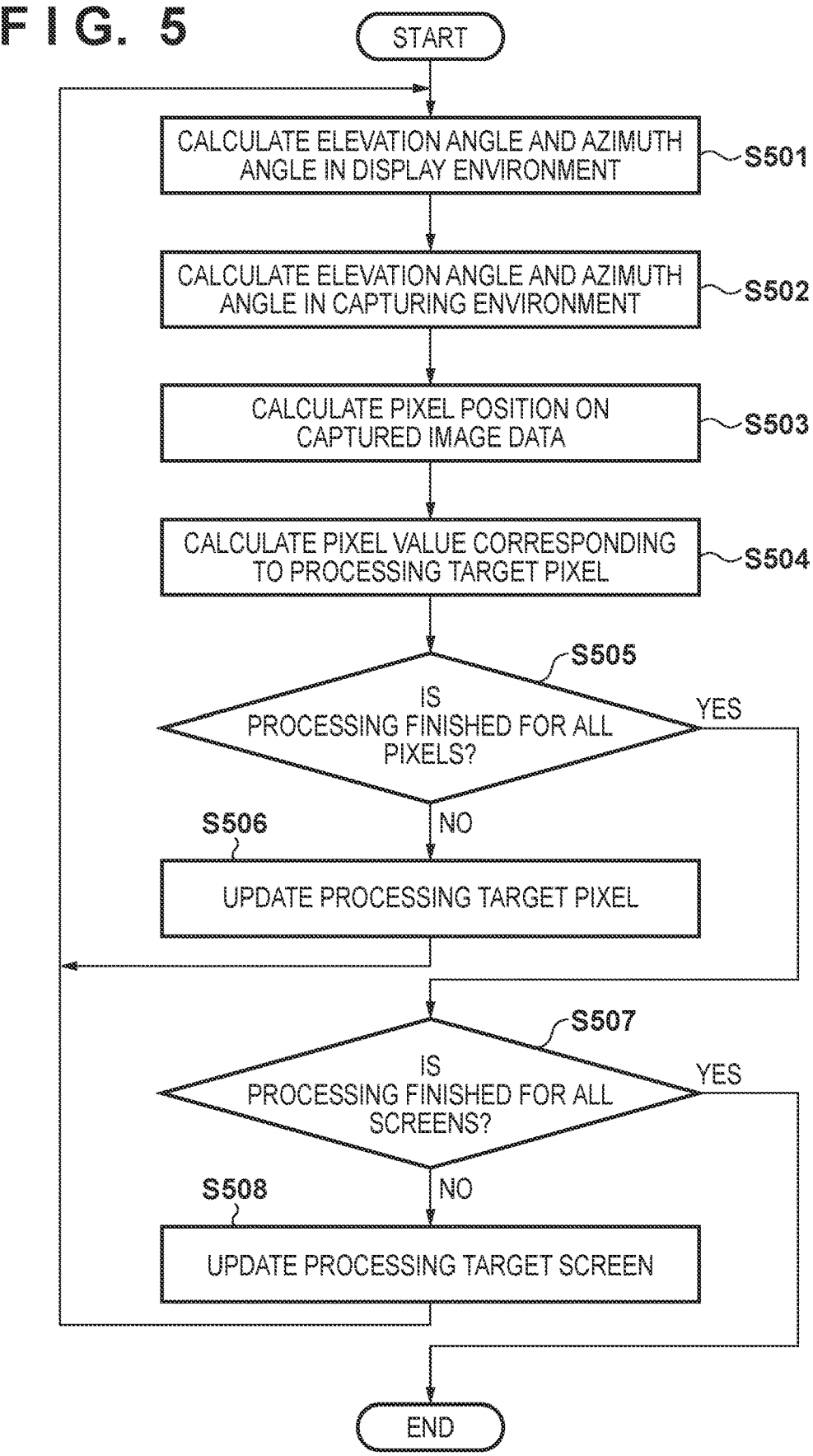

FIG. 9

| SCREEN | id | jd | ic | jc |
|---|---|---|---|---|
| CENTER | 0 | 0 | 0 | 710.2 |
| CENTER | 1 | 0 | 0.7 | 710.1 |
| CENTER | 2 | 0 | 1.5 | 710.0 |
| ⋮ | ⋮ | ⋮ | ⋮ | ⋮ |
| LEFT | 0 | 0 | 1400.1 | 725.5 |
| LEFT | 1 | 0 | 1400.7 | 725.5 |
| LEFT | 2 | 0 | 1401.4 | 725.4 |
| ⋮ | ⋮ | ⋮ | ⋮ | ⋮ |
| RIGHT | 0 | 0 | 2695.5 | 725.5 |
| RIGHT | 1 | 1 | 2696.2 | 725.4 |
| RIGHT | 2 | 0 | 2697.0 | 725.3 |
| ⋮ | ⋮ | ⋮ | ⋮ | ⋮ |

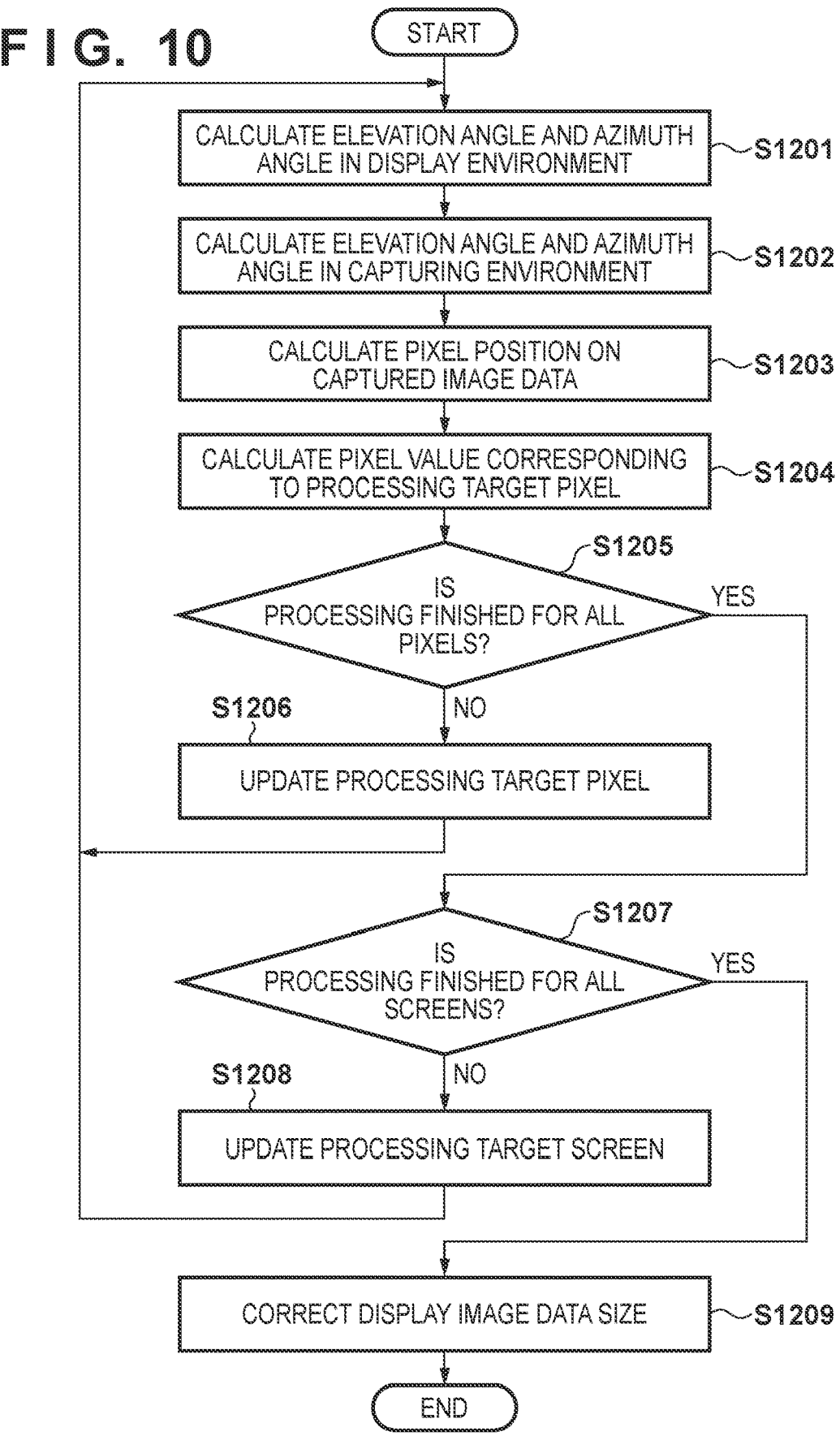

IMAGE PROCESSING APPARATUS, IMAGE PROCESSING METHOD, AND STORAGE MEDIUM

BACKGROUND OF THE INVENTION

Field of the Invention

The present invention relates to an image processing apparatus, an image processing method, and a storage medium, and for example, to a technology for generating display image data for display on a display surface.

Description of the Related Art

A large-visual-field video image display system is known as one type of video image display system. In this system, a display surface such as a screen is provided to cover the visual field of an observer in order to provide a high presence to the observer. As an example of such a system, a configuration is known in which a video image is projected on a screen of a concave surface shape that is a part of a spherical or cylindrical surface, or a plurality of flat screens combined to approximate the concave surface.

For a system using such a complex display surface, a technology is known that corrects an image to generate image data to be output to the display surface, thus reducing distortion of the image viewed by the observer. For example, Japanese Patent Laid-Open No. 2007-318754 discloses a technology for displaying a flat video image without distortion on a spherical screen arranged with a concave surface facing the observer. Specifically, Japanese Patent Laid-Open No. 2007-318754 discloses a method of pre-distorting a video image so as to eliminate distortion when the video image is displayed on a screen, by performing mapping processing in which a flat video image is placed on a spherical shape, and processing in which the placed image is projected in a flat shape.

SUMMARY OF THE INVENTION

According to an embodiment of the present invention, an image processing apparatus for converting captured image data into display image data for display on a display surface comprises: a setting unit configured to set a display magnification on the display surface for the captured image data; and a generating unit configured to generate the display image data from the captured image data, based on a relationship between a first direction from an observer viewpoint toward a position on the display surface at which an object is displayed when display is provided based on the captured image data in accordance with the display magnification and a second direction from an capturing viewpoint of the captured image data toward the object, such that an image of the object in the second direction from the capturing viewpoint of the captured image data is displayed at a position on the display surface in the first direction from the observer viewpoint.

According to another embodiment of the present invention, an image processing apparatus for converting captured image data into display image data for display on a display surface comprises: a setting unit configured to set a display magnification on the display surface for the captured image data; and a generating unit configured to generate the display image data from the captured image data such that an image of an object in a second direction from a capturing viewpoint of the captured image data is displayed at a position on the display surface in a first direction from an observer viewpoint of the display surface, wherein an elevation angle in the first direction is an elevation angle in the second direction multiplied by the display magnification and an azimuth angle in the first direction is an azimuth angle in the second direction multiplied by the display magnification.

According to still another embodiment of the present invention, an image processing apparatus for converting captured image data into display image data for display on a display surface comprises: a generating unit configured to generate the display image data from the captured image data such that, at a position on the display surface in a first direction from an observer viewpoint of the display surface, an image of an object in a second direction different from the first direction from an capturing viewpoint of the captured image data is displayed, wherein a ratio between an elevation angle and an azimuth angle of the first direction is equal to a ratio between an elevation angle and an azimuth angle of the second direction.

According to yet another embodiment of the present invention, an image processing method for converting captured image data into display image data for display on a display surface comprises: setting a display magnification on the display surface for the captured image data; and generating the display image data from the captured image data, based on a relationship between a first direction from an observer viewpoint toward a position on the display surface at which an object is displayed when display is provided based on the captured image data in accordance with the display magnification and a second direction from an capturing viewpoint of the captured image data toward the object, such that an image of the object in the second direction from the capturing viewpoint of the captured image data is displayed at a position on the display surface in the first direction from the observer viewpoint.

According to still yet another embodiment of the present invention, a non-transitory computer-readable medium stores a program which, when executed by a computer comprising a processor and a memory, causes the computer to perform: setting a display magnification on the display surface for the captured image data; and generating the display image data from the captured image data, based on a relationship between a first direction from an observer viewpoint toward a position on the display surface at which an object is displayed when display is provided based on the captured image data in accordance with the display magnification and a second direction from an capturing viewpoint of the captured image data toward the object, such that an image of the object in the second direction from the capturing viewpoint of the captured image data is displayed at a position on the display surface in the first direction from the observer viewpoint.

Further features of the present invention will become apparent from the following description of exemplary embodiments (with reference to the attached drawings).

BRIEF DESCRIPTION OF THE DRAWINGS

FIG. 2 is a block diagram illustrating an example of a functional configuration of an image processing apparatus according to an embodiment.

FIG. 3 is a flowchart illustrating a flow of an image processing method according to an embodiment.

FIG. 5 is a flowchart illustrating a flow of display image data generation processing according to an embodiment.

FIG. 9 is a diagram illustrating an example of a conversion table.

FIG. 10 is a flowchart illustrating a flow of an image processing method according to an embodiment.

DESCRIPTION OF THE EMBODIMENTS

The method in Japanese Patent Laid-Open No. 2007-318754 only provides display such that a flat video image is placed on a spherical screen, in other words, the method in Japanese Patent Laid-Open No. 2007-318754 only determines a method for projecting a flat video image onto a spherical screen through manual operation. Such a method poses a problem in that the method can cope only with video images captured by a specific method. That is, in various circumstances including, for example, a case where an image is displayed that is captured by an image capturing apparatus in accordance with capturing parameters different from presumed capturing parameters, it is difficult to realize video image display causing a high presence that provides a feeling of being at a site of image capturing. In particular, in a case where a video image captured with capturing parameters such as zoom magnification varied is displayed, maintaining the presence is not easy.

An embodiment of the present invention can enhance the presence in a case where an image is displayed on a display surface with a viewing angle different from the field angle of the image capturing apparatus during image capturing.

The embodiment of the present invention will be described below with reference to the drawings. Note that the embodiment described below does not limit the present invention, and not all the combinations of features described in the present embodiment are essential for the present invention. Note that the same reference signs are herein assigned to the same components.

Embodiment 1

Figure 4A:
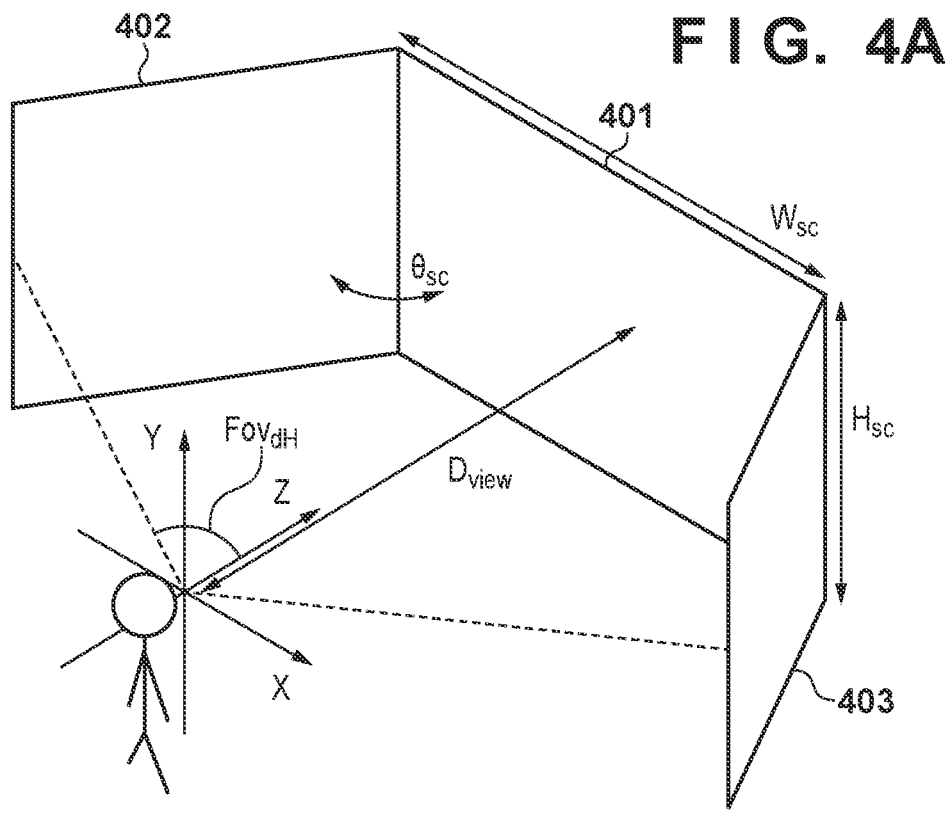
FIGS. 4A and 4B are diagrams illustrating an example of a configuration of a display apparatus.

FIG. 4A illustrates an example of a display system used in the present embodiment. A display apparatus 400 includes three flat screens (display surfaces) of a center screen 401, a left side screen 402, and a right side screen 403. These screens are arranged to cover the visual field of an observer. The three screens have a common size, and each screen has a width $W_{sc}$ and a height $H_{sc}$. In addition, the opening angle formed by the center screen 401 and the side screen 402 and 403 is represented as $\theta_{sc}$. The observer views these screens from an observer position at a distance of $D_{view}$ from the center of the center screen along the normal direction. As illustrated in FIG. 4A, an estimated angle of the entire screen at the observer position (which can be referred to as the viewing angle or display angle) is represented as $Fov_{dH}$. The following description uses XYZ three-dimensional coordinates illustrated in FIG. 4A and using the viewpoint position of the observer as an origin. Here, the center coordinates of the center screen can be represented as (0, 0, $D_{view}$).

Figure 4B:
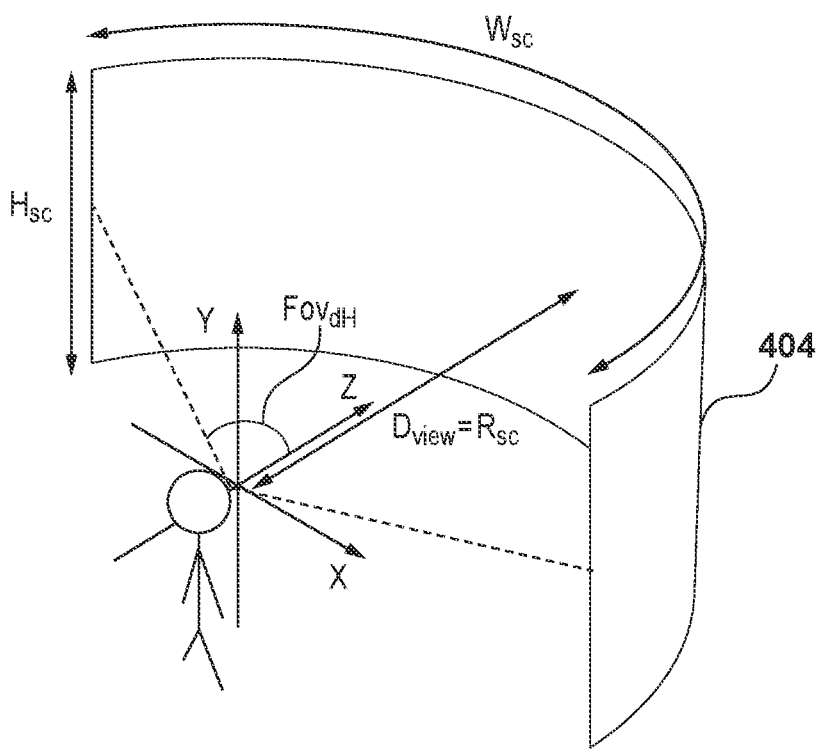

In the present embodiment, projectors (not illustrated) for displaying a video image are installed, the projectors corresponding the respective screens, and a display image is projected through the projectors. Of course, the configuration of the display apparatus is not limited to the combination of the projectors and the screens. For example, a self-emitting device such as a liquid crystal display can be used as the display apparatus. Additionally, the configuration of and a layout method for the display surfaces are not limited to those illustrated in FIG. 4A. Display surfaces having various sizes and shapes can be employed. For example, a screen including a curved surface or a spherical surface may be used. An example in which a screen including a curved surface is used is illustrated in FIG. 4B. A curved screen 404 with a radius $R_{sc}$ has a width $W_{sc}$ and a height $H_{sc}$. The observer views the screen from the observer position at a distance of $D_{view}$ from the curved screen along the normal direction. In any case, by referring to arrangement information of the display surface described below, each position on the display surface at which each pixel of the display image data is displayed can be represented using three-dimensional coordinates or using an elevation angle $\theta_d$ and an azimuth angle $\varphi_d$ described below.

Figure 1:
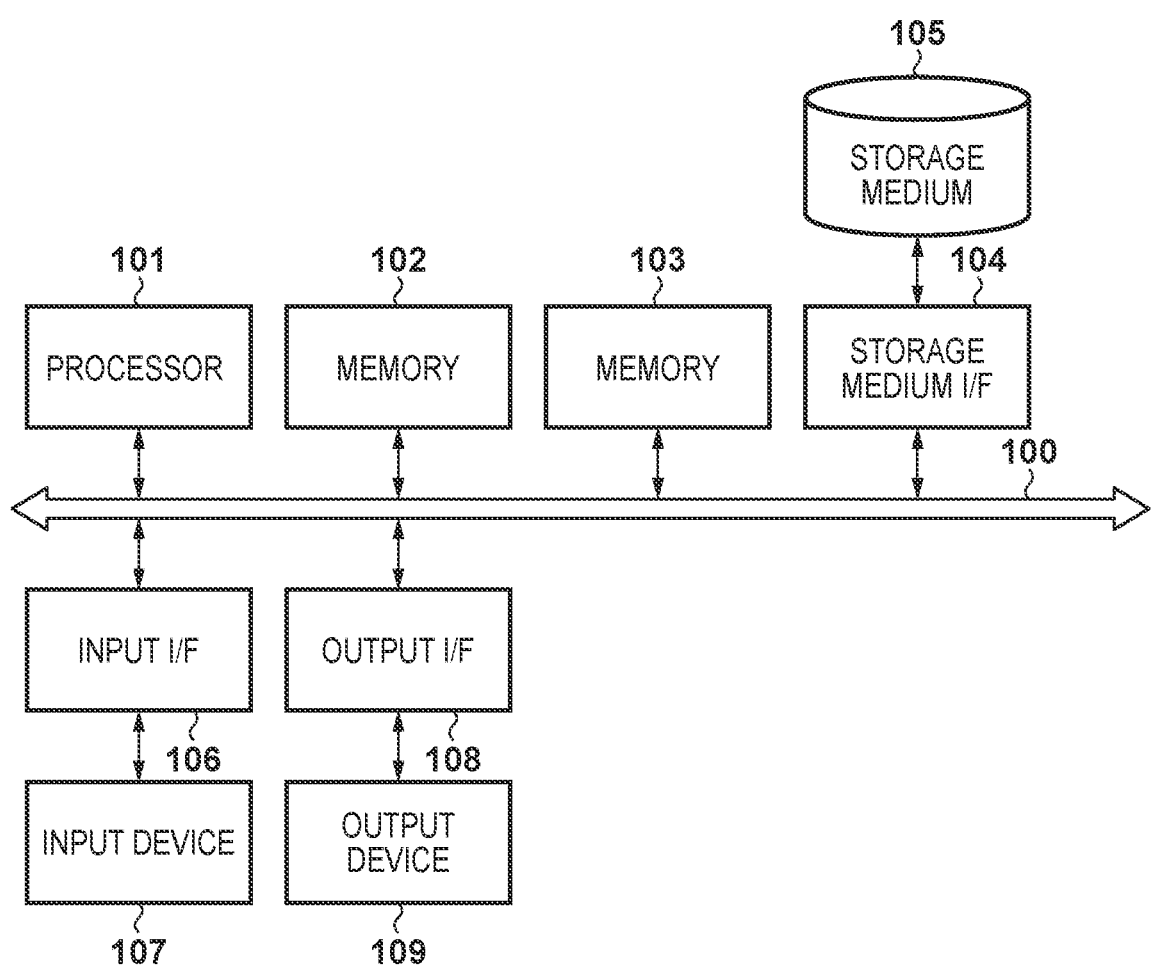
FIG. 1 is a diagram illustrating an example of a system configuration of an image processing apparatus according to an embodiment is illustrated.

An example of a hardware configuration of the image processing apparatus according to the present embodiment will be described with reference to FIG. 1. A computer as illustrated in FIG. 1 can be used as the image processing apparatus according to the present embodiment. A processor 101, for example, a CPU, executes programs while using a memory 102 as a work memory, and controls, via a system bus 100, each of components described below. With such configurations, various processes described below are executed. The processor 101 may read a program from a memory 103 or a storage medium 105 to the memory 102.

The memory 102 is a rewritable memory such as RAM. Additionally, the memory 103 is a read only memory such as ROM. A storage medium I/F 104 is an interface, for example, a serial ATA (SATA), and connects to a storage medium 105, which is a secondary storage device such as an HDD or an optical disc drive. The processor 101 can read data from the storage medium 105 and write data to the storage medium 105, via the storage medium I/F 104. The processor 101 may further load data stored in the storage medium 105 into the memory 102, and storing, in the storage medium 105, the data loaded into the memory 102. The processor 101 may then execute the data loaded into the memory 102 as a program.

An input I/F 106 is an interface to which an input device 107 such as a keyboard, mouse, or camera is connected, and may be a serial bus interface, for example, USB or IEEE 1394. The processor 101 may read data from the input device 107 via input I/F 106. An output I/F 108 is an interface to which an output device 109 such as a liquid crystal display or a projector is connected, and may be a video image output interface, for example, DVI or HDMI (trade name). The processor 101 may send the display data to the output device 109 via the output I/F 108 to perform display.

Now, functions of the image processing apparatus according to the present embodiment will be described with reference to FIG. 2, which is a block diagram illustrating a functional configuration of the image processing apparatus according to the present embodiment. The functions can be realized by the processor 101 executing the program as described above. On the other hand, the processor 101 need not implement all the functions. For example, the image processing apparatus may include a dedicated processing circuit that implements one or more functions.

To display, on the display surface, captured image captured by the image capturing apparatus, the image processing apparatus according to the present embodiment converts the captured image data into display image data for display on the display surface. Here, the image processing apparatus according to the present embodiment generates display image data based on a direction from an observer viewpoint of the display surface toward a display position and a direction from a capturing viewpoint of the captured image toward an object. In this way, by providing display such that the direction from the observer viewpoint of the display surface toward the display position corresponds to the direction from the capturing viewpoint of the captured image toward the object, video image display can be realized with high presence providing a feeling of being there. Accordingly, in an embodiment, display image data is generated based on capturing parameters such as the field angle of the image capturing apparatus during image capturing and lens information to allow reproduction of a space as viewed from the image capturing apparatus.

On the other hand, the field angle of the image capturing apparatus is not always equal to the viewing angle of the display surface. For example, depending on the type of the lens or the focal length used by the image capturing apparatus, the capturing field angle may be smaller than the viewing angle for the display screen from the observer. In such a case, when display is provided such that the direction from the observer viewpoint toward the display position matches the direction from the capturing viewpoint toward the object, no video image is displayed in a certain region at the periphery of the display screen. Additionally, in a case where a video image captured while varying the capturing parameters such as the zoom magnification is displayed, no video image may be displayed at the periphery of the display screen during a certain period of time while displaying the video image. Here, in a case where the visual field of the observer is covered with a video image and the display image is enlarged to enhance the presence, the displayed video image may be unnaturally distorted, providing the observer with an unnatural sensation.

In the present embodiment, when the display image is enlarged or reduced, consideration is given of a first direction from the observer viewpoint of the display surface toward the position on the display surface at which the object is displayed, and a second direction from the capturing viewpoint of the captured image data toward the object. For example, by performing enlargement or reduction such that the direction from the observer viewpoint of the display surface toward the display position corresponds to the direction from the capturing viewpoint of the captured image toward the object, distortion of the image caused by the enlargement or reduction and that is visible to the observer can be suppressed. In the present embodiment, by way of example, a display image is generated from a captured image to make the ratio between the elevation angle and the azimuth angle constant between a capturing environment and a display environment. To perform such image processing, an embodiment uses display environment information identifying the direction from the observer viewpoint to each position on the display surface, and capturing environment information identifying the direction from the capturing viewpoint of the image capturing apparatus toward an object at a pixel in the captured image data.

A display information acquisition unit 201 acquires arrangement information of the display surface. The arrangement information may be information indicating the spatial arrangement of the pixels in the display surface. In a configuration in which an image is projected on the display surface, a pixel in the display surface refers to a portion on the display surface on which one pixel in a projected image is projected. For example, the arrangement information can include information indicating the shape, size, number, and physical arrangement of the display surfaces and the number of pixels in the displayed image. The display information acquisition unit 201 may acquire, from the input device 107, the arrangement information input by the user. Additionally, a package of the information for each display surface may be stored in the storage medium 105, and the display information acquisition unit 201 may acquire the information from the storage medium 105.

A viewpoint position acquisition unit 202 acquires position information of the observer viewpoint. The position information of the observer viewpoint is information indicating the three-dimensional position of the viewpoint of the observer viewing the display surface. The viewpoint position acquisition unit 202 may acquire the information input by the user, from the input device 107 or from a tracking apparatus (not illustrated) automatically measuring the viewpoint position. Additionally, the viewpoint position may be predetermined as an ideal viewpoint position associated with the display surface. In this case, the viewpoint position acquisition unit 202 may acquire the position information of the observer viewpoint from the information package for each display surface stored in the storage medium 105 as described above. In this way, the viewpoint position of the observer may be input or tracked at the time of observation, while a fixed predetermined value may be used as the viewpoint position. Hereinafter, as illustrated in FIGS. 4A and 4B, a case where the viewpoint position is located at the origin of XYZ orthogonal coordinates will be described.

The use of the position information of the observer viewpoint and the arrangement information of the display surface allows, for each of the pixels in the display image output to the display surface, acquisition of an observer direction from the observer viewpoint toward the display position of the pixel on the display surface. As described above, in an embodiment, the position information of the observer viewpoint and the arrangement information of the display surface are acquired as display environment information identifying the direction from the observer viewpoint of the display surface toward each position on the display surface. However, another information may be used as display environment information.

A capturing information acquisition unit 203 acquires capturing setting information of the image capturing apparatus. For example, the capturing information acquisition unit 203 can acquire imaging range information of the image capturing apparatus having acquired the captured image data. The imaging range information may include the capturing field angle of the image capturing apparatus, the focal length, and a projection method for the lens used for image capturing. The use of such imaging range information allows, for each of the pixels in the captured image, acquisition of a capturing direction from the capturing viewpoint toward the object corresponding to the pixel. The capturing setting information may further include aberration information indicating aberrations of the lens used for image capturing. The capturing information acquisition unit 203 may acquire the information from metadata indicating capturing information added to the captured image data acquired by an image acquisition unit 205 described below. The capturing information acquisition unit 203 may acquire, from the input device 107, the information input by the user.

The use of such capturing setting information allows identification of a direction from the capturing viewpoint of the image capturing apparatus having acquired the captured image data toward the object projected on the pixels in the captured image data. Thus, in an embodiment, as capturing environment information identifying the direction from the capturing viewpoint of the image capturing apparatus having acquired the captured image data to the object projected on the pixels in the captured image data, the capturing field angle information of the image capturing apparatus is acquired. Additionally, as the capturing environment information, the focal length of the image capturing apparatus, the projection method for the lens used for image capturing, and the like may be acquired. On the other hand, other information may be used as the capturing environment information.

A magnification setting unit 204 sets a display magnification for the captured image data on the display surface. The display magnification is used when an image generation unit 206 generates a display image. In the present embodiment, the user sets a display magnification α. In other words, the magnification setting unit 204 may acquire, from the input device 107, the display magnification α input by the user.

Here, the display magnification α represents the ratio of the elevation angle and the azimuth angle in the display environment to the elevation angle and the azimuth angle in the capturing environment. For example, in a case where the image magnification α is 1, the elevation angle and the azimuth angle in the capturing environment are equal to the elevation angle and the azimuth angle in the display environment. In this case, the image is displayed on the display surface so as to reproduce the elevation angle and the azimuth angle in the capturing environment in a case where the image is viewed from the observer viewpoint. On the other hand, when α is larger than 1, display is provided such that the object appears to be larger than in the capturing environment. In addition, when α is smaller than 1, display is provided such that the object appears to be smaller than in the capturing environment. In this case, the elevation angle and the azimuth angle in the display environment are respectively larger or smaller than the elevation angle and the azimuth angle in the capturing environment by the same magnification α, the ratio between the elevation angle and the azimuth angle is constant between the capturing environment and the display environment. As a result, distortion of the image as viewed from the observer viewpoint is suppressed.

The image acquisition unit 205 acquires the captured image data. In a case where the captured image data from the image capturing apparatus is stored in the storage medium 105, the image acquisition unit 205 may acquire the captured image data stored in the storage medium 105. Meanwhile, the image acquisition unit 205 may acquire the captured image data from the image capturing apparatus included in the input device 107, via the input I/F 106.

The image generation unit 206 generates display image data from the captured image data. In the present embodiment, the image generation unit 206 generates display image data from the captured image data such that an image of the object in the second direction from the capturing viewpoint of the captured image data is displayed at a position on the display surface in the first direction from the observer viewpoint. Here, the first direction is a direction from the observer viewpoint of the display surface toward the position on the display surface at which the object is displayed when display based on the captured image data is provided in accordance with the display magnification. Additionally, the second direction is a direction from the capturing viewpoint of the captured image data toward the object. The image generation unit 206 can generate display image data based on a relationship between the first direction and the second direction. Specific processing of the image generation unit 206 will be described below.

An image output unit 207 outputs display image data generated by the image generation unit 206 to the projector included in the output device 109 via the output I/F 108. In this way, the projector operates to display, on each screen of the display surface, the display image based on the display image data. The image output unit 207 may store the generated display image data in the storage medium 105 for later output to the display surface.

The image generation unit 206 functions to display an image of the object in the second direction from the capturing viewpoint of the captured image data, at a position on the display surface in the first direction from the observer viewpoint of the display surface. In an embodiment, the first direction is different from the second direction, and the ratio between the elevation angle and the azimuth angle is equal between the first direction and the second direction. Additionally, in an embodiment, the elevation angle in the second direction is the elevation angle in the first direction multiplied by the display magnification, and the azimuth angle in the second direction is the azimuth angle in the first direction multiplied by the display magnification.

Now, processing according to the present embodiment will be described with reference to a flowchart in FIG. 3. In a step S301, the display information acquisition unit 201 acquires the arrangement information of the display surface as described above. In a step S302, the viewpoint position acquisition unit 202 acquires the position information of the observer viewpoint as described above.

In a step S303, the capturing information acquisition unit 203 acquires the capturing setting information of the image capturing apparatus as described above. In a step S304, the magnification setting unit 204 sets the display magnification for the captured image data on the display surface as described above.

In a step S305, the image acquisition unit 205 acquires the captured image data as described above. In a case where the image capturing apparatus acquires captured video image data constituted by a plurality of frame images, the image acquisition unit 205 can acquire one frame image constituting the captured video image data as the captured image data. In a step S306, the image generation unit 206 generates display image data as described below in detail based on the information acquired and set in the previous steps. In a step S307, the image output unit 207 outputs the display image data generated by the image generation unit 206.

In a step S308, the image acquisition unit 205 performs termination determination for the processing. For example, in a case where a user instruction indicating an end command is acquired from the input device 107, the image acquisition unit 205 can determine to end the processing. As another example, the image acquisition unit 205 can determine to end the processing in a case of acquiring the last frame image constituting the captured video image data is acquired in the step S305. In a case where the processing is not to be ended, the processing proceeds to a step S309. In a case where the processing is to be ended, the processing in FIG. 3 ends.

In the step S309, the image acquisition unit 205 determines whether the configuration has been changed. In the present embodiment, the image acquisition unit 205 determines whether the capturing setting information or the display magnification has been changed. The capturing setting information and the display magnification may be changed based on user instructions, or may be changed based on metadata added to the captured video image data or the frame image of the captured image data. In a case where the setting has been changed, the processing returns to the step S303, and in the steps S303 and S304, the changed setting is acquired, and display image data is generated based on the new setting. In a case where the setting has not been changed, the processing returns to the step S305 and display image data continues to be generated based on a similar setting.

Display Image Data Generation Processing

Hereinafter, the display image data generation processing performed by the image generation unit 206 in the step S306 will be described with reference to a flowchart in FIG. 5. In the following description, for each of the screens 401 to 403 included in the display surface, display image data used for projection is generated sequentially. Hereinafter, the screen for which display image data is generated is referred to as a processing target screen.

Figure 6A:
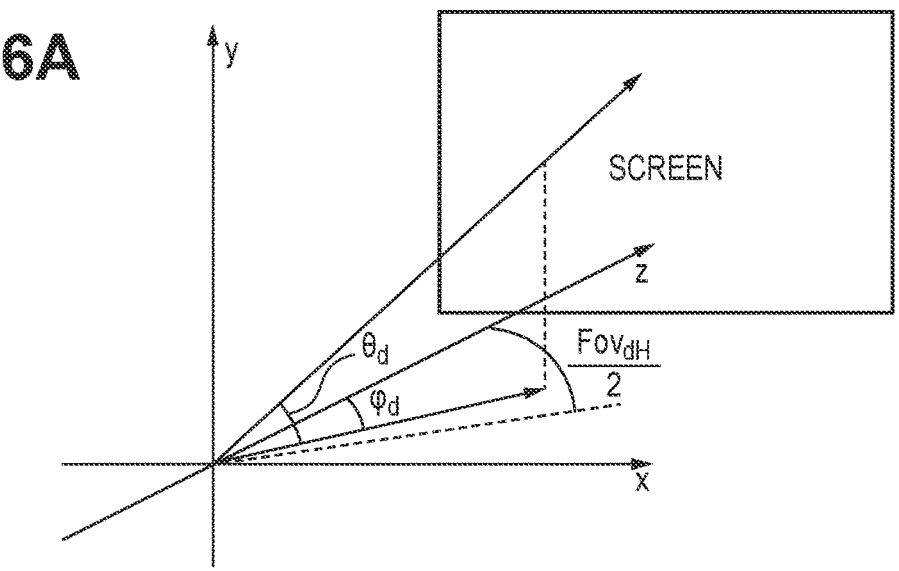
FIGS. 6A and 6B are diagrams illustrating a relationship between an elevation angle and an azimuth angle.
Figure 6B:
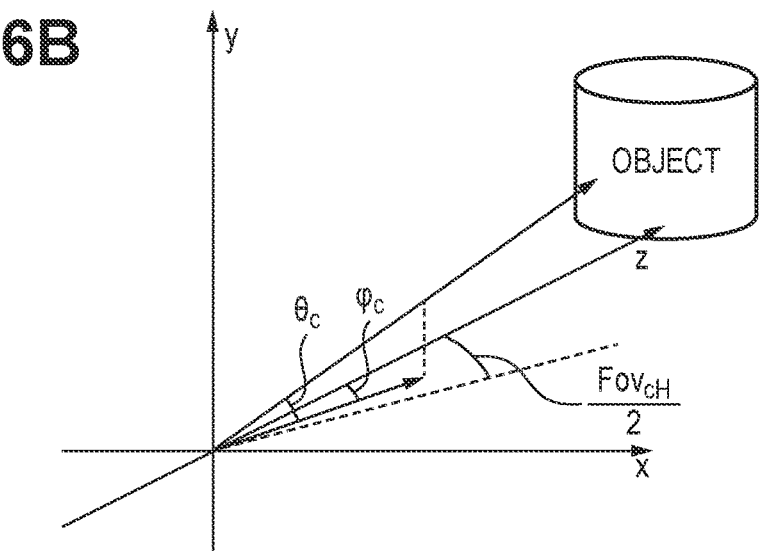

FIG. 6A illustrates an example of the display environment, and FIG. 6B illustrates an example of the capturing environment. In the present embodiment, display image data is generated such that an image of the object in the second direction from the capturing viewpoint of the captured image data is displayed at a position on the display surface in the first direction from the observer viewpoint of the display surface. Here, display image data is generated so as to make the following ratios constant: the ratio ($\varphi_d/\theta_d$) between the elevation angle $\theta_d$ and the azimuth angle $\varphi_d$ in the first direction with respect to the front direction in the display environment and the ratio ($\varphi_c/\theta_c$) between the elevation angle $\theta_c$ and the azimuth angle $\varphi_c$ in the second direction with respect to the optical axis direction in the capturing environment. As described above, a horizontal viewing angle in the display environment (angle from the front direction to lateral ends) is represented as $Fov_{dH}$, and a horizontal field angle of the captured image (angle from the optical axis direction to lateral ends) is represented as $Fov_{cH}$.

In a step S501, the image generation unit 206 identifies the first direction from the observer viewpoint of the display surface toward a position of interest on the display surface at which the object is displayed. The processing can be performed based on display environment information identifying the direction from the observer viewpoint of the display surface to each position on the display surface. In the present embodiment, the image generation unit 206 can calculate the elevation angle $\theta_d$ and the azimuth angle $\varphi_d$ in the display environment corresponding to a processing target pixel in a processing target screen, based on the position information of the observer viewpoint and the display surface arrangement information of the display surface. The first direction described above can be represented using the elevation angle $\theta_d$ and the azimuth angle $\varphi_d$. As a specific example of processing, the image generation unit 206 may calculate a vector (x, y, z) from the viewpoint position toward three-dimensional coordinates on the screen at which the processing target pixel is displayed. The vector (x, y, z) can be calculated in accordance with the position of the observer viewpoint, the arrangement of the display surface (e.g., the position and the dimensions $W_{sc}$ and $H_{sc}$), the number of pixels in the display image data, and the like. Then, the image generation unit 206 may calculate the elevation angle $\theta_d$ and the azimuth angle $\varphi_d$ from the vector (x, y, z) in accordance with Equation (1).

$$\theta_d = \sin^{-1}\left(\frac{y}{\sqrt{x^2 + y^2 + z^2}}\right) \quad (1)$$

$$\varphi_d = \tan^{-1}\left(\frac{x}{z}\right)$$

In a step S502, the image generation unit 206 identifies the second direction from the capturing viewpoint of the captured image data toward the object, based on the display magnification α and the first direction from the observer viewpoint of the display surface toward the position on the display surface at which the object is displayed. In the present embodiment, the image generation unit 206 calculates the elevation angle $\theta_c$ and the azimuth angle $\varphi_c$ in the capturing environment based on the display magnification α, the elevation angle $\theta_d$ and the azimuth angle $\varphi_d$ of the display surface. The second direction described above can be represented using the elevation angle $\Theta_c$ and the azimuth angle $\varphi_c$. As a specific example of processing, the image generation unit 206 may calculate the elevation angle $\theta_c$ and the azimuth angle $\varphi_c$ in accordance with Equation (2).

$$\theta_c = (1/\alpha)\theta_d$$

$$\varphi_c = (1/\alpha)\varphi_d \quad (2)$$

According to Equation (2), an object that is present in the capturing environment in the direction of the elevation angle $\theta_c$ and the azimuth angle $\varphi_c$ is displayed in the display environment at the position of the elevation angle $\alpha \times \theta_c$ and the azimuth angle $\alpha \times \varphi_c$. In this way, the elevation angle $\theta_d$ in the first direction can be the elevation angle $\theta_c$ in the second direction multiplied by the display magnification α, and the azimuth angle $\varphi_d$ in the first direction can be the azimuth angle $\varphi_c$ in the second direction multiplied by the display magnification α. According to such a configuration, the ratio ($\varphi_d/\theta_d$) between the elevation angle $\theta_d$ and the azimuth angle $\varphi_d$ in the first direction is equal to the ratio ($\varphi_c/\theta_c$) between the elevation angle $\theta_d$ and the azimuth angle $\varphi_d$ in the second direction. In this way, by calculating the elevation angle and the azimuth angle in the capturing environment so as to maintain the ratio between the elevation angle and the azimuth angle, the image can be enlarged with distortion of the display image in a particular direction suppressed.

In a step S503, the image generation unit 206 identifies a pixel position on the captured image data corresponding to the second direction from the capturing viewpoint of the captured image data toward the object. In the present embodiment, the image generation unit 206 calculates the two-dimensional coordinates (ic, jc) of the pixel, which correspond to a pixel position in the captured image data corresponding to the elevation angle $\theta_c$ and the azimuth angle $\varphi_c$ based on the capturing setting information of the image capturing apparatus. In the present embodiment, the capturing setting information includes the projection method for the lens, a focal length f, and a horizontal image size W and a vertical image size H of the captured image data. In a case where the image capturing apparatus captures an image using an equisolid angle projection type fish-eye lens, two-dimensional coordinates (ic, jc) can be calculated in accordance with Equations (3) to (5).

A relationship between an image height r, an incident angle θ, and the focal length f in equisolid angle projection is indicated in Equation (3).

$$r = 2f\sin(\theta/2) \qquad (3)$$

Figure 7:
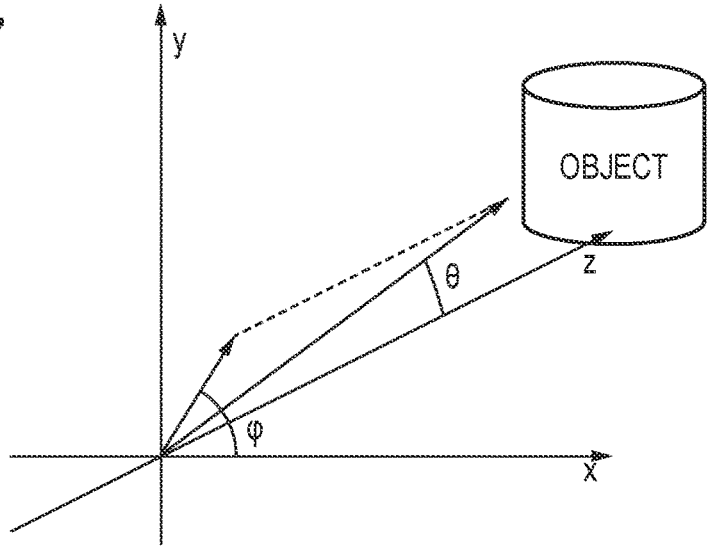
FIG. 7 is a diagram illustrating a relationship between an incident angle and a deviation angle.

The incident angle θ and the deviation angle φ can be calculated from the elevation angle $\theta_c$ and the azimuth angle $\varphi_c$ in the capturing environment in accordance with Equation (4). FIG. 7 illustrates the incident angle θ and the deviation angle φ. The incident angle θ is an angle formed between a unit vector corresponding to the elevation angle $\theta_c$ and the azimuth angle $\theta_c$ and the optical axis at the time of image capturing (z axis in the present embodiment). Additionally, the deviation angle φ is an angle formed between the x axis and a vector obtained by projecting, on an xy plane, the unit vector corresponding to the elevation angle $\theta_c$ and the azimuth angle $\theta_c$.

$$\theta = \cos^{-1}(\cos\theta_c \cdot \cos\varphi_c) \qquad (4)$$

$$\cos\varphi = \frac{\cos\theta_c \cdot \sin\varphi_c}{\sqrt{(\cos\theta_c \cdot \sin\varphi_c)^2 + (\sin\theta_c)^2}}$$

$$\sin\varphi = \frac{\sin\theta_c}{\sqrt{(\cos\theta_c \cdot \sin\varphi_c)^2 + (\sin\theta_c)^2}}$$

Additionally, two-dimensional coordinates (ic, jc) on the captured image data corresponding to the incident angle θ and the deviation angle φ can be expressed by Equation (5) using a horizontal image size W and a vertical image size H of the captured image data.

$$i_c = \frac{\cos\varphi \cdot \sin\frac{\theta}{2}}{\sin\left(\frac{Fov_{cH}}{2}\right)} W \qquad (5)$$

$$j_c = \frac{\sin\varphi \cdot \sin\frac{\theta}{2}}{\sin\left(\frac{Fov_{cV}}{2}\right)} H$$

In a step S504, the image generation unit 206 determines image information of the display image data at the position of interest on the display surface based on the image information of the captured image data for the pixel position identified in the step S503. In the present embodiment, the image generation unit 206 acquires, as image information, a pixel value in the captured image data corresponding to the two-dimensional coordinates (ic, jc) of the pixel in the captured image data. In a case where the coordinate values are not integer values, the image generation unit 206 may calculate the pixel value by performing interpolation processing such as nearest neighbor interpolation, bilinear interpolation, or bicubic interpolation. The pixel information thus obtained is used as image information of the display image data at the position of interest on the display surface. In the present embodiment, the image generation unit 206 sets the pixel value obtained in this manner as the pixel value of the processing target pixel in the display image data displayed on the processing target screen.

In a step S505, the image generation unit 206 determines whether processing of all of the pixels in the display image data for the processing target screen is ended. In a case where any pixel is unprocessed, the processing proceeds to a step S506. In a case where processing of all the pixels is ended, the processing proceeds to a step S507. In the step S506, the image generation unit 206 selects the unprocessed pixel as a processing target pixel, and then the processing returns to the step S501.

In the step S507, the image generation unit 206 determines whether the processing is ended for all the screens. In a case where any screen is unprocessed, the processing proceeds to a step S508. In a case where the processing is ended for all the screens, the processing in FIG. 5 ends. In the step S508, the image generation unit 206 selects the unprocessed screen as a processing target screen, and selects one of the pixels in the display image data corresponding to the processing target screen as a processing target pixel. Thereafter, the processing returns to the step S501.

The processing described above can generate display image data corresponding to all the screens. In the present embodiment, with the image enlarged or reduced according to the viewing angle of the display surface, the captured image is converted such that the ratio between the elevation angle and the azimuth angle in the capturing environment and the ratio between the elevation angle and the azimuth angle in the display environment are constant. Thus, even in a case where the viewing angle of the display surface is different from the capturing field angle, image display can be provided that reduces an unnatural sensation while enhancing presence. In particular, even in a case where a captured video image is displayed with the capturing parameters such as the field angle varied, the presence can be maintained with the unnatural sensation suppressed.

Although the case of processing the captured image data obtained using the equisolid angle projection type fish-eye lens has been described, captured image data can also be used that is obtained using other projection methods such as center projection or equidistant projection. That is, according to the projection method, two-dimensional coordinates (ic, jc) on the captured image data can be calculated from the incident angle θ, the deviation angle φ, and the image size of the captured image data. For example, in the case of center projection, the relationship between the image height r, the incident angle θ, and the focal length f can be expressed by Equation (6), and thus the two-dimensional coordinates (ic, jc) on the captured image data can be calculated in accordance with Equation (7).

$$r = f \cdot \tan\theta \qquad (6)$$

$$i_c = \frac{\cos\varphi \cdot \tan\theta}{\tan(Fov_{cH})} W \qquad (7)$$

$$j_c = \frac{\sin\varphi \cdot \tan\theta}{\tan(Fov_{cV})} H$$

Additionally, the display magnification α can be automatically set by an information processing apparatus instead of being set based on the user instruction. For example, the magnification setting unit 204 may set the display magnification α based on the arrangement information of the display surface, the capturing setting information of the image capturing apparatus, and the like. As an example, the magnification setting unit 204 may set the display magnification based on the field angle from the capturing viewpoint corresponding to at least a partial region of the captured image data displayed on the display surface and the viewing angle of the display surface from the observer viewpoint.

For example, the magnification setting unit 204 may set the display magnification α based on the field angle from the capturing viewpoint of the entire captured image data and the viewing angle of the display surface from the observer viewpoint. Here, the field angle and viewing angle may be the field angle and viewing angle in the vertical direction or in the horizontal direction. As a specific example, the magnification setting unit 204 may set the display magnification α such that the viewing angle from the observer viewpoint with respect to the display image data displayed on the display surface is equal to the viewing angle of the display surface. That is, the magnification setting unit 204 may set the display magnification α so as to display the horizontal field angle of the captured image data according to the horizontal viewing angle in the display environment, and in other words, to enlarge the captured image according to the horizontal viewing angle in the display environment.

In this case, the magnification setting unit 204 may set the display magnification α in accordance with Equation (8) based on the horizontal field angle $Fov_{cH}$ of the captured image and the horizontal viewing angle $Fov_{dH}$ in the display environment. By setting the display magnification α as described above, display image data can be generated so as to associate the horizontal field angle of the captured image with the horizontal viewing angle in the display environment.

$$\alpha = Fov_{dH}/Fov_{cH} \qquad (8)$$

In a case where the field angle from the capturing viewpoint corresponding to the captured image data is smaller than the viewing angle of the display surface from the observer viewpoint, the magnification setting unit 204 may set the display magnification α as described above. That is, in a case where margins are formed in the display surface when display is provided according to the field angle from the capturing viewpoint, the magnification setting unit 204 may set the display magnification α to enlarge the captured image for display. On the other hand, in a case where the field angle from the capturing viewpoint corresponding to the captured image data is equal to or more than the viewing angle of the display surface from the observer viewpoint, the magnification setting unit 204 may set the display magnification α to 1 to display the captured image without enlargement.

As another example, the magnification setting unit 204 may set the display magnification based on the field angle from the capturing viewpoint corresponding to a partial region of the captured image data displayed on the display surface and the viewing angle of the display surface from the observer viewpoint. As an example, performing image processing to zoom the captured image data can enlarge a partial region of the captured image data for display. At this time, the magnification setting unit 204 may set the display magnification α so as to adjust the horizontal viewing angle resulting from zooming to the horizontal viewing angle in the display environment. For example, in the case of the equisolid angle projection method, a horizontal viewing angle $Fov'_{cH}$ resulting from β-times zooming can be calculated in accordance with Equation (9). In Equation (9), sensor H is the horizontal size of the sensor of the image capturing apparatus, and β is the zoom magnification.

$$Fov'_{cH} = 4\sin^{-1}\left(\frac{sensorH}{4f\beta}\right) \qquad (9)$$

Additionally, in the case of the center projection method, the horizontal viewing angle $Fov'_{cH}$ resulting from β-times zooming can be calculated in accordance with Equation (10).

$$Fov'_{cH} = 2\tan^{-1}\left(\frac{sensorH}{2f\beta}\right) \qquad (10)$$

In these cases, the magnification setting unit 204 may set the display magnification α in accordance with Equation (11) based on the horizontal field angle $Fov'_{cH}$ and the horizontal viewing angle $Fov_{dH}$ in the display environment, which result from the zooming By setting the display magnification α in this way, display image data can be generated so as to associate the horizontal viewing angle resulting from the β-times zooming corresponds to the horizontal viewing angle in the display environment.

$$\alpha = Fov_{dH}/Fov'_{cH} \qquad (11)$$

Embodiment 2

In Embodiment 2, the image generation unit 206 generates display image data so as to compensate for aberrations caused by the image capturing apparatus having acquired captured image data. For example, in the step S306, the image generation unit 206 may generate display image data while performing aberration correction processing based on aberration information of the lens. The present embodiment is similar to Embodiment 1, and components and processing different from those of Embodiment 1 will be described below.

In the present embodiment, at the step S503, the image generation unit 206 calculates a pixel position on the captured image data so as to correct aberrations based on the aberration information of the lens used for image capturing, the aberration information being included in the capturing setting information. For example, after calculating two-dimensional coordinates (ic, jc) of a pixel in the captured image data in the same manner as in Embodiment 1, the image generation unit 206 can correct the two-dimensional coordinates. A case where distortion aberrations caused by the lens are corrected will be described.

As the aberration information, for example, a polynomial coefficient indicating the distortion aberration of the lens can be used. In this case, the image generation unit 206 may correct the two-dimensional coordinates (ic, jc) of the pixel in the captured image data in accordance with Equation (12). In Equation (12), two-dimensional coordinates (i'c, j'c) indicate a corrected pixel position, $a_0$ to $a_n$ are coefficients indicating distortion aberrations, and R is an image height ratio at the pixel position (ic, jc). The image height ratio is the ratio of the image height at the pixel position to a particular image height (e.g., the maximum image height of the captured image data).

$$i'_c = i_c(1 + a_0 + a_1R + a_2R^2 + \ldots + a_nR^n) \qquad (12)$$

$$j'_c = j_c(1 + a_0 + a_1R + a_2R^2 + \ldots + a_nR^n)$$

This allows calculation of the pixel position (i'c, j'c) on the captured image data involving distortion, with the pixel position (i'c, j'c) corresponding to the pixel position (ic, jc) involving no distortion. In the subsequent step S504, the image generation unit 206 may acquire the pixel value in the captured image data corresponding to the corrected two-dimensional coordinates (i'c, j'c).

Aberrations that can be corrected are not limited to distortion aberrations, and other aberrations of the lens can be corrected. For example, magnification chromatic aberrations of the lens can be corrected as follows. Hereinafter, a case will be described in which the captured image data is RGB color image data and in which a polynomial coefficient indicating the magnification chromatic aberration of the lens as aberration information is used.

In this case, the image generation unit 206 can use the aberration information to correct the two-dimensional coordinates (ic, jc) on the captured image data in accordance with Equations (13) and (14) so as to correct the pixel position corresponding to an R plane and a B plane according to a G plane. In Equation (13), two-dimensional coordinates (i'cR, j'cR) indicate a pixel position in the corrected R plane, and $aR_0$ to $aR_n$ are coefficients indicating magnification chromatic aberrations of the R plane with respect to the G plane. In Equation (14), two-dimensional coordinates (i'cB, j'cB) indicate a pixel position in the corrected B plane, and $aB_0$ to $aB_n$ are coefficients indicating magnification chromatic aberrations of the B plane with respect to the G plane.

$$i'_{cR}=i_c(1+\alpha R_0+\alpha R_1 R+\alpha R_2 R^2+ \ldots +\alpha R_n R^n) \quad (13)$$

$$j'_{cR}=j_c(1+\alpha R_0+\alpha R_1 R+\alpha R_2 R^2+ \ldots +\alpha R_n R^n)$$

$$i'_{cB}=i_c(1+\alpha B_0+\alpha B_1 R+\alpha B_2 R^2+ \ldots +\alpha B_n R^n) \quad (14)$$

$$j'_{cB}=j_c(1+\alpha B_0+\alpha B_1 R+\alpha B_2 R^2+ \ldots +\alpha B_n R^n)$$

This allows calculation of the pixel positions (i'cR, j'cR) and (i'cB, j'cB) for the R and B planes on the captured image data involving chromatic aberrations, the pixel positions (i'cR, j'cR) and (i'cB, j'cB) corresponding to pixel positions (ic, jc) involving no chromatic aberrations. In the subsequent step S504, the image generation unit 206 may acquire pixel values in the captured image data corresponding to the corrected two-dimensional coordinates (ic, jc), (i'cR, j'cR), and (i'cB, j'cB) in the respective planes.

The above-described processing can suppress the effect of lens aberrations (e.g., distortion aberrations or magnification chromatic aberrations) used during image capturing when display image data is created. In the present embodiment, the polynomial coefficient indicating aberrations of the lens is used as the aberration information. However, the type of the aberration information is not limited to this. For example, as aberration information indicating distortion aberrations, a table can be used as aberration information in which an image height involving no aberrations is associated with an image height affected by aberrations. In this case, based on the image height at the two-dimensional position of a pixel and the table, the image generation unit 206 can calculate a corrected two-dimensional position.

Embodiment 3

In the steps S501 to S503 of Embodiments 1 and 2, the image generation unit 206 calculates the pixel position on the captured image data corresponding to the processing target pixel in the display image data based on the capturing setting information and the display magnification. In the present embodiment, the image generation unit 206 acquires a table indicating the correspondence of pixel positions. The table indicates the correspondence between the pixel position on the display image data corresponding to the first direction from the observer viewpoint of the display surface toward the position on the display surface at which the object is displayed, and the pixel position on the captured image data corresponding to the second direction from the capturing viewpoint of the captured image data toward the object. Then, the image generation unit 206 uses the table to identify the pixel position on the captured image data corresponding to the pixel position on the display image data.

In the present embodiment, the image generation unit 206 acquires, based on the capturing setting information and the display magnification, a conversion table providing the pixel position on the captured image data corresponding to the target processing target pixel in the display image data. After the capturing setting information and the display magnification are acquired in the steps S303 to S304, the processing can be performed before the captured image data is acquired in the step S305. Instead of executing the steps S501 to S503, the image generation unit 206 references the conversion table to identify the pixel position on the captured image data corresponding to the processing target pixel in the display image data. The present embodiment is similar to Embodiment 2, and components and processing different from those of Embodiment 2 will be described below. Of course, as is the case with Embodiment 1, the processing may be performed without any aberration information.

First, processing in which the image generation unit 206 acquires the conversion table will be described with reference to a flowchart in FIG. 8. Steps S1001 to S1003 and S1005 to S1008 are similar to the steps S501 to S503 and S505 to S508 in FIG. 5 and are thus omitted from the description.

In a step S1004, the image generation unit 206 records a combination of the pixel position (id, jd) of the processing target pixel and the pixel position (i'c, j'c) on the captured image data calculated in the step S1003 in the memory 102. By performing this processing on all of the pixels in the display image data corresponding to each screen, the image generation unit 206 can acquire the conversion table in which the pixels in the display image data are associated with the pixels in the captured image data. An example of acquired conversion table is illustrated in FIG. 9. FIG. 9 illustrates, as (ic, jc), the pixel position (i'c, j'c) on the captured image data corresponding to the pixel position (id, jd) on the display image data for each of the screens (center, left, and right).

When performing the processing in accordance with FIG. 5, the image generation unit 206 may reference, instead of performing the processing in the steps S501 to S503, the conversion table obtained as described above to identify the pixel position on the captured image data corresponding to the processing target pixel in the display image data. Then, the image generation unit 206 may generate display image data by calculating, from the captured image data, the pixel value corresponding to the processing target pixel in the display image data.

According to the present embodiment, the processing load of the display image data generation processing in the step S306 can be reduced. The conversion table can be acquired when, in the step S309, the setting is determined to have been changed. On the other hand, when, in the step S309, the setting is determined not to have been changed, the processing returns to the step S305, and thus, the conversion table acquisition processing can be omitted. In another embodiment, in response to a change in at least one of the display environment information, the capturing environment information, and the display magnification, the image generation unit 206 may update the table to acquire the conversion table. Such a configuration enables a general reduction in the processing time required to generate the display image data.

Figure 8:
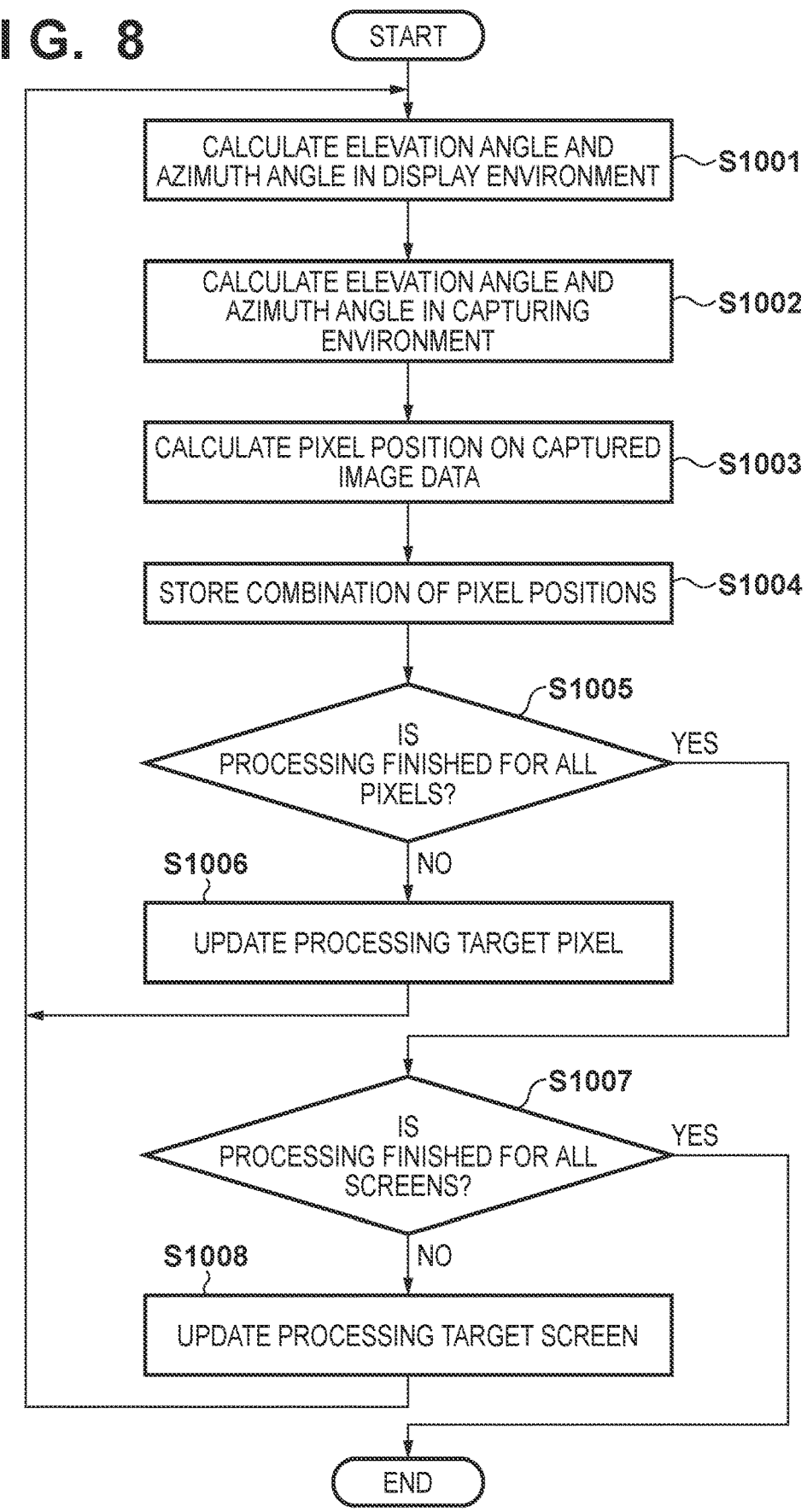
FIG. 8 is a flowchart illustrating a flow of conversion table acquisition processing according to an embodiment.

Instead of generating a conversion table in accordance with the processing in FIG. 8, the image generation unit 206 may acquire a conversion table created in advance. In this case, the image generation unit 206 may select one of a plurality of conversion tables created in advance that satisfies conditions. The conditions can include, for example, a combination of the capturing setting information and the display magnification. Additionally, the conditions may further include the arrangement information of the display surface or the position information of the observer viewpoint. In this case, conversion tables can be created in advance that correspond to the respective conditions. Then, the image generation unit 206 may select conversion tables associated with conditions close to acquired conditions such as the capturing setting information, the display magnification, and the like. In a case where, based on a predetermined determination condition, no conversion tables are determined to be associated with conditions close to the acquired conditions, the image generation unit 206 may present a warning or end the processing.

Embodiment 4

In Embodiments 1 to 3, the image generation unit 206 generates display image data having an image size based on the arrangement information of the display surface acquired by the display information acquisition unit 201. On the other hand, in the display apparatus illustrated in FIGS. 4A and 4B, the image size such as the aspect ratio of the display surface may be different from the image size in the known methods. On the other hand, in transfer of image data, the transfer may be performed in accordance with a standardized image size. Thus, in the present embodiment, the image generation unit 206 further generates display image data in accordance with a predetermined image size.

In the present embodiment, the image generation unit 206 corrects the display image data such that corrected image data has the predetermined image size with the center of the image data maintained. For example, the image generation unit 206 may generate display image data such that an image of an object at a central position of an image having an image size based on the arrangement information of the display surface matches an image of the object at a central position of an image having the predetermined image size. The predetermined image size may be an image size that can be input to a typical display apparatus, for example, the image size prescribed in the standard such as FullHD (1920×1080), DCI 4K (4096×2160), or 4K UHDTV (3840×2160).

In the present embodiment, the display information acquisition unit 201 may acquire, from the input device 107, the predetermined image size input by the user. Alternatively, the display information acquisition unit 201 may acquire the predetermined image size from the storage medium 105. The present embodiment is similar to the Embodiment 2, and components and processing different from those of Embodiment 2 will be described below. Of course, as is the case with Embodiment 1, the processing may be performed without any aberration information.

In the present embodiment, in the step S306, the image generation unit 206 generates display image data in accordance with the predetermined image size. This processing will be described with reference to a flowchart in FIG. 10. Steps S1201 to S1208 are similar to the steps S501 to S508 in FIG. 5 and are omitted from the description.

As described above, the processing in the steps S1201 to S1208 generates display image data in accordance with the image size based on the arrangement information of the display surface. In a step S1209, the image generation unit 206 converts the display image data generated in accordance with the image size based on the arrangement information of the display surface into image data having the predetermined image size. In the present embodiment, in the image size based on the arrangement information of the display surface, the width corresponds to $W_0$ pixels and the height corresponds to $H_0$ pixels. In the predetermined image size, the width corresponds to $W_1$ pixels, and the height corresponds to $H_1$ pixels.

In the present embodiment, a case will be described in which at least one of the width and the height in the predetermined image size is larger than the width or the height in the image size based on the arrangement information of the display surface. In this case, in the step S1209, the image generation unit 206 may perform processing of adding margins to an upper and a lower portions and a left and a right portions of the display image data generated in accordance with the image size based on the arrangement information of the display surface, such that corrected image data has the predetermined image size. Such processing allows the display image data to be corrected such that the corrected image data has the predetermined image size with the center maintained.

In an embodiment, the image generation unit 206 adds an equal amount of margins to the upper and the lower portions or to the left and the right portions. For example, in a case where the height in the predetermined image size is larger than the height in the image size based on the arrangement information of the display surface, the image generation unit 206 may add, to each of the upper and lower ends of the image, a margin including the same number of lines. Additionally, in a case where the width in the predetermined image size is larger than the width in the image size based on the arrangement information of the display surface, the image generation unit 206 may add, to each of the left and right ends of the image, a margin including the same number of lines. The image generation unit 206 may calculate the width $\Delta W$ of the margin added to each of the left and right portions and the width $\Delta H$ of the margin added to each of the upper and lower portions, in accordance with Equation (15).

$$\Delta W = (W_1 - W_0)/2$$

$$\Delta H = (H_1 - H_0)/2 \qquad (15)$$

Figure 11A:
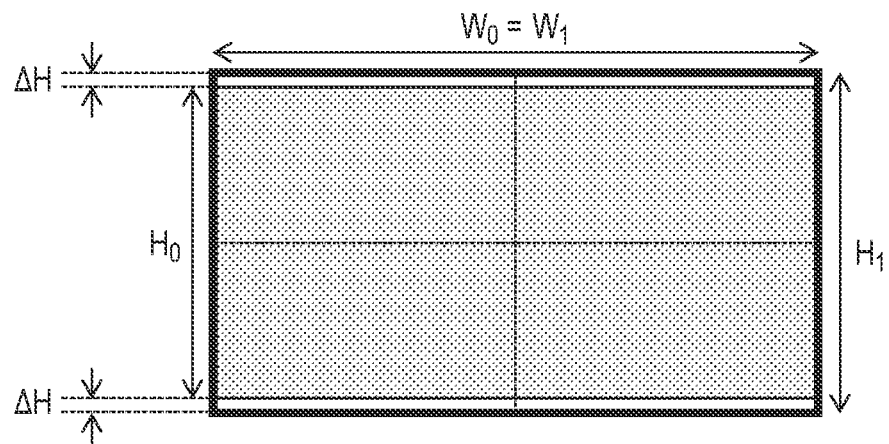
FIGS. 11A and 11B are diagrams illustrating examples of display image data corrected to a predetermined image size.

FIG. 11A illustrates an example of a case in which the height in the predetermined image size is larger than the height in the image size based on the arrangement information of the display surface. In this case, the image generation unit 206 may add, to each of the upper and lower portions of the image, a margin including pixels corresponding to the width $\Delta H$, to correct the display image data for all the screens generated so as to have the image size based on the arrangement information of the display surface such that corrected image data has the predetermined image size. Note that a predetermined pixel value such as a pixel value corresponding to black can be set for each of the pixels in the margin area.

According to the present embodiment, the image size can be corrected so as to maintain the central position of the display image data. As a result, when the display image data is checked on a display or the like, the central position of the display image is easily recognized.

Note that in the present embodiment, the example has been described in which an image is displayed on the three screens but that the present embodiment can also be applied to a case where an image is displayed on a curved screen. The display image data corresponding to the curved screen has an image size corresponding to the width $W_{sc}$ and height $H_{sc}$ of the curved screen. Thus, the image size of the display image data is often larger in the lateral direction than in the vertical direction.

Hereinafter, a case will be described in which at least one of the width and the height in the image size based on the arrangement information of the display surface is larger than the width or the height in the image size prescribed in the standard. In this case, the display generation unit 206 can convert the display image data of the image size based on the arrangement information of the display surface such that converted image data has a size equal to the image size prescribed in the standard multiplied by a predetermined number.

Figure 11B:
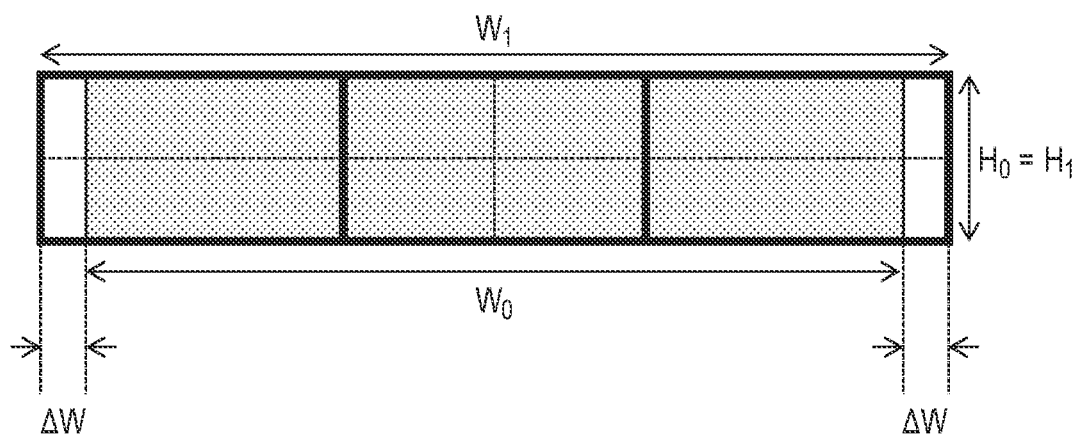

FIG. 11B illustrates an example of a case in which display image data having an image size corresponding to a curved screen is converted into image data having a predetermined image size. Here, the width in the predetermined image size is determined to be three times as large as the width in the image size prescribed in the standard. Additionally, the width in the predetermined image size is determined to be larger than the width in the image size based on the arrangement information of the display surface. In this case, the display generation unit 206 may add, to each of the left and right portions of the image, a margin including pixels corresponding to the width ΔW to correct the display image data generated in accordance with the image size based on the arrangement information of the display surface such that corrected image data has the predetermined image size.

Note that in a case where the display image data is created based on the conversion table as in Embodiment 3, the conversion table may be corrected to correct the display image data such that corrected image data has the predetermined image size.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-202079, filed on Oct. 26, 2018, which is hereby incorporated by reference herein in its entirety.

What is claimed is:

1. An image processing apparatus for converting captured image data into display image data for display on a display surface, comprising one or more processors and one or more memories storing one or more programs, wherein the one or more programs cause the one or more processors to perform:
   setting a display magnification on the display surface for the captured image data of an image of an object;
   calculating, based on the display magnification and a first direction from an observer viewpoint toward a position on the display surface, a second direction from a capturing viewpoint of the captured image data toward the object; and
   generating, based on the captured image data, the display image data such that the image of the object in the second direction from the capturing viewpoint of the captured image data is displayed at a position on the display surface in the first direction from the observer viewpoint,
   wherein an elevation angle of the first direction is an elevation angle of the second direction multiplied by the display magnification, and an azimuth angle of the first direction is an azimuth angle of the second direction multiplied by the display magnification.

2. The image processing apparatus according to claim 1, wherein the calculating comprises:
   identifying the first direction for a position of interest on the display surface; and
   identifying the second direction based on the display magnification and the first direction, and
   wherein the generating comprises:
   identifying a pixel position on the captured image data corresponding to the second direction; and
   determining image information of the display image data at the position of interest on the display surface based on image information of the captured image data for the identified pixel position.

3. The image processing apparatus according to claim 1, wherein a ratio between an elevation angle and an azimuth angle of the first direction is equal to a ratio between an elevation angle and an azimuth angle of the second direction.

4. The image processing apparatus according to claim 1, wherein an elevation angle in the first direction is an elevation angle in the second direction multiplied by the display magnification and an azimuth angle in the first direction is an azimuth angle in the second direction multiplied by the display magnification.

5. The image processing apparatus according to claim 1, wherein the setting includes setting the display magnification based on a field angle from the capturing viewpoint corresponding to at least a partial region of the captured image data and a viewing angle of the display surface from the observer viewpoint.

6. The image processing apparatus according to claim 1, wherein the setting includes setting the display magnification such that a viewing angle from the observer viewpoint with respect to the display image data displayed on the display surface is equal to a viewing angle of the display surface from the observer viewpoint in a case where a field angle from the capturing viewpoint corresponding to the captured image data is smaller than the viewing angle of the display surface.

7. The image processing apparatus according to claim 1, wherein
the generating includes generating, based on the captured image data, the display image data such that, at a position on the display surface in the first direction from the observer viewpoint of the display surface, the image of the object in the second direction from the capturing viewpoint of the captured image data is displayed, and
wherein a ratio between an elevation angle and an azimuth angle of the first direction is equal to a ratio between an elevation angle and an azimuth angle of the second direction.

8. The image processing apparatus according to claim 1, wherein the one or more programs further cause the one or more processors to perform acquiring display environment information identifying a direction from the observer viewpoint of the display surface toward each position on the display surface.

9. The image processing apparatus according to claim 8, wherein the display environment information comprises position information of the observer viewpoint and arrangement information of the display surface.

10. The image processing apparatus according to claim 1, wherein the one or more programs further cause the one or more processors to perform acquiring, for each pixel of the captured image data, capturing environment information identifying a direction from a capturing viewpoint of an image capturing apparatus having acquired the captured image data toward an object projected on the pixel.

11. The image processing apparatus according to claim 10, wherein the capturing environment information includes field angle information of the image capturing apparatus.

12. The image processing apparatus according to claim 1, wherein the one or more programs further cause the one or more processors to perform acquiring a table indicating correspondence between pixel positions in the display image data corresponding to the first direction and pixel positions in the captured image data corresponding to the second direction.

13. The image processing apparatus according to claim 12, wherein the acquiring includes acquiring the table in response to a change in at least one of display environment information identifying a direction from the observer viewpoint of the display surface toward each position on the display surface, capturing environment information identifying, for each pixel in the captured image data, a direction from the capturing viewpoint of an image capturing apparatus having acquired the captured image data toward the object projected on the pixel, or the display magnification on the display surface for the captured image data.

14. The image processing apparatus according to claim 1, wherein the generating includes generating the display image such that aberrations caused by an image capturing apparatus having acquired the captured image data is compensated.

15. The image processing apparatus according to claim 1, wherein the generating includes correcting the display image data such that corrected image data has a predetermined image size with a center of the display image data maintained.

16. An image processing method for converting captured image data into display image data for display on a display surface, comprising:
setting a display magnification on the display surface for the captured image data of an image of an object;
calculating, based on the display magnification and a first direction from an observer viewpoint toward a position on the display surface, a second direction from a capturing viewpoint of the captured image data toward the object; and
generating, based on the captured image data, the display image data such that the image of the object in the second direction from the capturing viewpoint of the captured image data is displayed at a position on the display surface in the first direction from the observer viewpoint,
wherein an elevation angle of the first direction is an elevation angle of the second direction multiplied by the display magnification, and an azimuth angle of the first direction is an azimuth angle of the second direction multiplied by the display magnification.

17. The method according to claim 16, wherein the calculating comprises:
identifying the first direction for a position of interest on the display surface; and
identifying the second direction based on the display magnification and the first direction, and
wherein the generating comprises:
identifying a pixel position on the captured image data corresponding to the second direction; and
determining image information of the display image data at the position of interest on the display surface based on image information of the captured image data for the identified pixel position.

18. A non-transitory computer-readable medium storing a program which, when executed by a computer comprising a processor and a memory, causes the computer to perform:
setting a display magnification on a display surface for captured image data of an image of an object;
calculating, based on the display magnification and a first direction from an observer viewpoint toward a position on the display surface, a second direction from a capturing viewpoint of the captured image data toward the object; and
generating, based on the captured image data, display image data such that the image of the object in the second direction from the capturing viewpoint of the captured image data is displayed at a position on the display surface in the first direction from the observer viewpoint,
wherein an elevation angle of the first direction is an elevation angle of the second direction multiplied by the display magnification, and an azimuth angle of the first direction is an azimuth angle of the second direction multiplied by the display magnification.

19. The medium according to claim 18, wherein the calculating comprises:
identifying the first direction for a position of interest on the display surface; and identifying the second direction based on the display magnification and the first direction, and wherein the generating comprises:

identifying a pixel position on the captured image data corresponding to the second direction; and determining image information of the display image data at the position of interest on the display surface based on image information of the captured image data for the identified pixel position.

* * * * *